United States Patent [19]
Hayes et al.

[11] Patent Number: 5,620,291
[45] Date of Patent: Apr. 15, 1997

[54] QUICK DISCONNECT FASTENER

[75] Inventors: Earl J. Hayes, Northville; Stefano Spadoni; Jason E. Porter, both of Livonia, all of Mich.

[73] Assignee: Alcoa Fujikura Ltd., Brentwood, Tenn.

[21] Appl. No.: 603,950

[22] Filed: Feb. 16, 1996

[51] Int. Cl.$^6$ ........................................... F16B 19/00
[52] U.S. Cl. ........................ 411/552; 411/550; 411/549; 411/553
[58] Field of Search .................................. 411/552, 553, 411/549, 550, 551, 349

[56] References Cited

U.S. PATENT DOCUMENTS

| | | | |
|---|---|---|---|
| 1,895,826 | 1/1933 | Trudeau | 411/552 |
| 2,260,048 | 10/1941 | Newell | 411/552 |
| 2,282,360 | 5/1942 | Horrocks | 411/553 |
| 2,314,368 | 3/1943 | Poupitch | 411/549 |
| 2,372,496 | 3/1945 | Huelster | 411/549 |
| 2,839,808 | 6/1958 | Zahodiakin | 411/551 |

*Primary Examiner*—Steven N. Meyers
*Assistant Examiner*—Fredrick Conley
*Attorney, Agent, or Firm*—Tracey D. Beiriger

[57] ABSTRACT

A device used to fasten and retain two or more conducting elements with sufficient normal force to insure a reliable electrical contact. The device consists of three individual parts: a bolt, a nut, and a spring washer. The bolt of this invention differs from conventional bolts in that it has no threads and has a keying feature. The nut is distinguishable from a standard nut in that it also has no typical thread, but has a keying feature and internal ramps. The spring washer provides a linear increase in force proportional to deflection. Like the bolt and nut, the spring washer also has a keying feature.

16 Claims, 2 Drawing Sheets

QUICK DISCONNECT FASTENER

FIELD OF THE INVENTION

The present invention relates to connecting two or more electrically conductive elements or terminals together to assure reliable electrical contact between them, and to a quick disconnect assembly comprising a threadless nut and bolt, and a spring washer. This invention is particularly useful for high current applications.

BACKGROUND OF THE INVENTION

As well known in the art, battery posts or terminals provide the means by which a battery is electrically connected to various electrical components in an automobile. The connections are by means of cables electrically connected between the battery posts and the electrical components. To supply electrical power to a power distribution box, a cable is run from the battery to the box. The electrical connection is made by connecting one end of a cable to the B+ terminal of the battery and the other end of the cable to the power terminal of the distribution box. Typically, the cable is secured to the terminal of the distribution box using a threaded bolt and torque prevailing nut. To assure that a sufficient electrical connection is made and maintained, a sufficient normal force is produced by establishing friction between the bolt and nut. Often it is difficult, however, due to operator variability, to achieve and/or maintain the proper amount of friction between the bolt and nut to insure reliable electrical contact and withstand loosening when vibration is typically encountered.

Conventional methods utilizing threaded nut and bolt assemblies are dependent on torque gun repeatability and operator performance to achieve the proper friction for creating sufficient clamping force. Further, such nut and bolt assemblies are difficult to remove once they are secured. Also, threaded nut and bolt assemblies are often cross threaded during assembly. It is desirable to provide a fastener that may easily be used in assembly, that minimizes operator error and that can easily be disconnected once installed.

It is an objective of the present invention to provide a quick disconnect B+ connector which eliminates loose electrical connections between battery cables and power distribution boxes.

It is another objective of the present invention to provide a quick disconnect B+ connector which is not loosened by vibration.

It is still another objective of the present invention to provide a quick disconnect B+ connector which does not rely on friction at the electrical interface for producing the normal fastening force.

It is a further objective and an advantage of the present invention to provide a quick disconnect B+ connector which can be installed with minimal operator error.

It is another advantage of the present invention to provide a quick disconnect B+ connector which may be easily and economically manufactured.

SUMMARY OF THE INVENTION

This invention is directed to a device used to fasten and retain two or more conducting elements with sufficient normal force to insure a reliable electrical contact. The device consists of three individual parts: a bolt or pin, a nut or keeper, and a biasing element such as a spring washer. The bolt of this invention differs from conventional bolts in that it reacts not primarily through threads, but through a keying feature. The nut is distinguishable from a standard nut in that it also has no typical thread, but has a keying feature and internal ramps. The preferred spring washer provides a linear increase in force generally proportional to deflection. Like the bolt and nut, the spring washer also has a keying feature.

BRIEF DESCRIPTION OF THE DRAWINGS

The features of this invention which are novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF PREFERRED EMBODIMENTS

Figure 1:
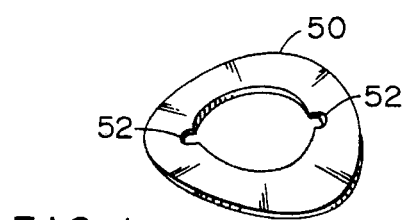
FIG. 1 is an exploded view of the quick disconnect fastener, the bolt, the nut and the spring washer according to a preferred embodiment of the present invention.

Referring now to the drawings in greater detail, and first to FIG. 1, a threadless bolt or pin, generally designated 10, the threadless nut 30 and spring washer 50 according to the invention are shown. Bolt or pin 10 includes head 12 and stem or shank which extends outwardly from and perpendicular to head 12. Stem 14 is cylindrical and has first end 16 that abuts head 12 and opposite second end 18. Bolt 10 also includes keying means 20 which consists of two pairs of opposed longitudinal ribs 22 and 25. Ribs 22 extend approximately ⅛ to ¼ of the length of stem 14 from opposite second end 18 toward first end 16. Ribs 25 extend approximately ⅛ to ¼ of the length of stem 14 from first end 16 toward second end 18. The required length of the ribs depends on the number of conducting elements that are to be connected. The preferred embodiment includes diametrically opposed rib pairs, although the number and orientation of the ribs can vary.

Figure 2:
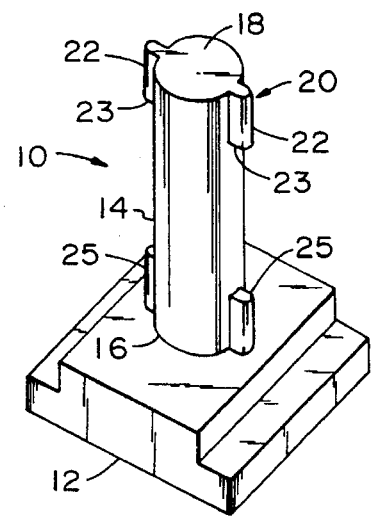
FIG. 2 is a bottom planar view of the threadless nut taken along line 2—2 of FIG. 1.
Figure 2:
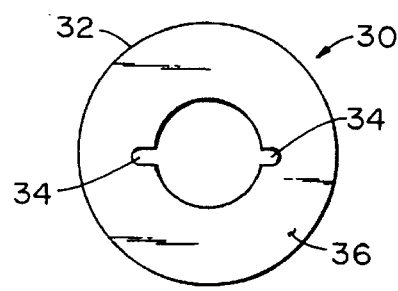

The threadless nut or collar 30 of the invention can be the standard size and shape similar to a conventional hex nut but in FIG. 1 is shown having a circular configuration and an outside diameter 32. Nut 30 has a pair of internal slots 34 that run from a first surface 36 of the nut to a second, opposed surface 38. Slots 34 correspond to ribs 22 and 25 on bolt 10 such that nut 30 can receive and suitably engage the shank of bolt 10. FIG. 2 shows a bottom planar view of the threadless nut.

Figure 3:
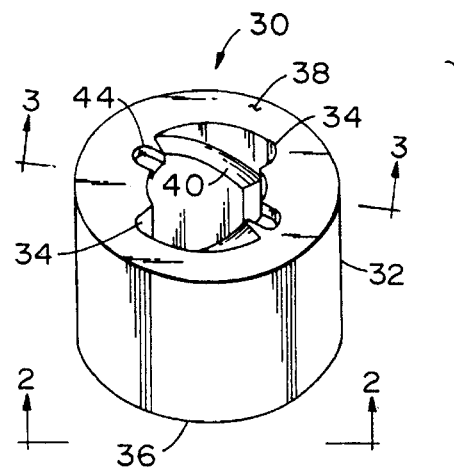
FIG. 3 is an isometric cross sectional view of the threadless nut taken along line 3—3 of FIG. 1.
Figure 3:
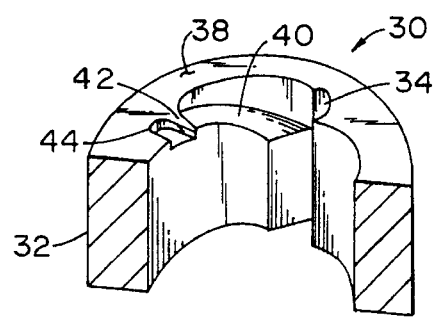

Nut 30 further includes a pair of internal ramps 40, shown as arcuate in FIG. 3, ending at the second surface 38 of nut 30. These ramps 40 extend approximately one-quarter of the distance around the nut and provide a camming surface for rib faces 23 to follow in interlocking bolt 10 and nut 30. A notch 44 can be provided near the end 42 of each ramp for receiving one of the ribs 22 of bolt 10. After the ribs are inserted into internal slots 34 and contact ramps 40 of nut 30, the nut can be rotated approximately a quarter of a turn or 90° so that ribs 22 travel to and seat into notches 44. Hence, ribs 22 are used as a locator for nut 30 and a guiding surface for the travel of ramps 40.

In this embodiment, nut 30 can only be in a locked or unlocked position. Therefore, the current problem of torque gun variability when operators are responsible for fully tightening conventional fasteners is overcome by this invention. Operators only need to turn nut 30 by using a specially designed tool such that ribs 22 engage notches 44 to ensure that nut 30 is locked into place. A quick visual inspection can verify that nut 30 and bolt 10 are correctly engaged. Only when the locked position is achieved will the needed electrical contact be made.

Figure 4:
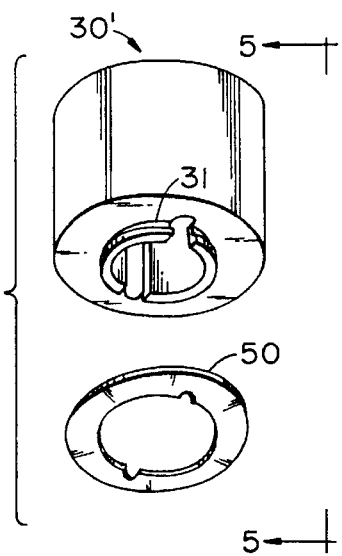
FIG. 4 is a perspective view of the preferred nut having a retaining groove for retaining the spring washer according to the present invention.
Figure 5:
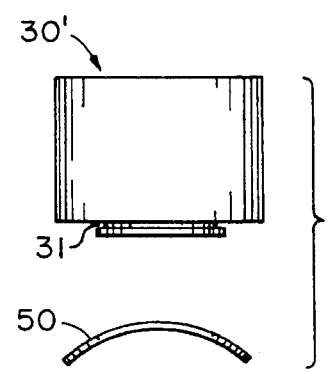
FIG. 5 is a side view of the preferred nut and the spring washer according to the present invention.

The fastener assembly can also employ a coil spring (not shown) or a spring washer 50 as shown in perspective in FIG. 1. Other spring or biasing means may also be used. Spring washer 50 preferably attaches to nut 30 and, like nut 30, has a corresponding keying feature 52 that permits it to pass over ribs 22 and 25 of bolt 10. Hence, the keying features on the bolt, nut and washer are aligned as shown in FIG. 1. Nut 30 may be provided with a groove 31, as also shown in FIGS. 4 and 5, in which spring washer 50 will be positioned and retained. It is necessary to deflect spring washer 50 to position it in groove 31. Although spring washer 50 is depicted as circular, other shapes may be employed.

Figure 6:
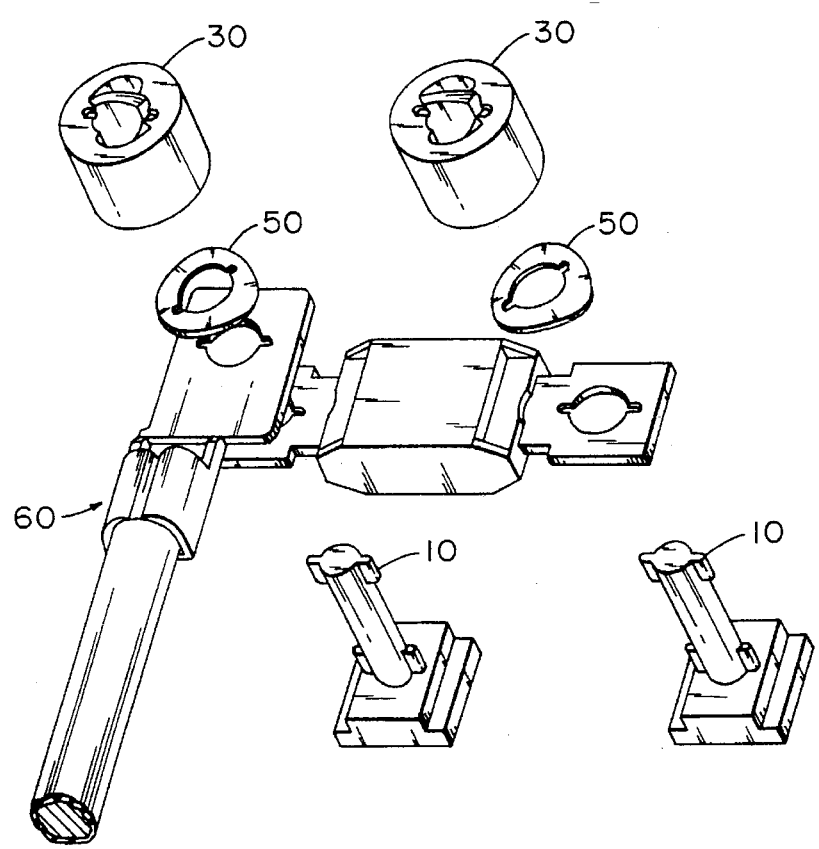
FIG. 6 is an exploded view of the fastener assembly connecting two conducting elements.

The spring washer 50 is not flat, but is curved and provides a linear force to assembly 60 (shown in FIGS. 6 and 7) tending to retain the assembly 60 in an interlocked configuration. This force is referred to as linear in that it acts in a direction generally aligned with the longitudinal extent of the quick disconnect assembly. The linear force is generally proportional to the amount of deflection placed on the spring washer when the bolt and nut are used to connect two components together. Further, during such washer deflection, nut ramps 40 provide a surface for ribs 22 to follow. The ramps provide a relatively large deflection travel with a relatively small degree of turn of the nut 30 about stem 14. Thus, rather than relying on friction and proper torquing for achieving sufficient normal force, as is done with conventional fasteners, such normal force in the invention is created via deflection of spring washer 50. Therefore, the amount of normal force placed on the system for which the fastener assembly 60 (FIG. 7) is being used can easily be calculated because the force is directly related to the washer deflection. Depending on the spring means used, the normal force created generally ranges from 10 to 150 pounds. However, linear forces exceeding 1500 pounds, far more than what is required for a stable electrical interface, have been measured. When using conventional fasteners, resultant normal force values are very difficult to determine and are generally not known.

Figure 7:
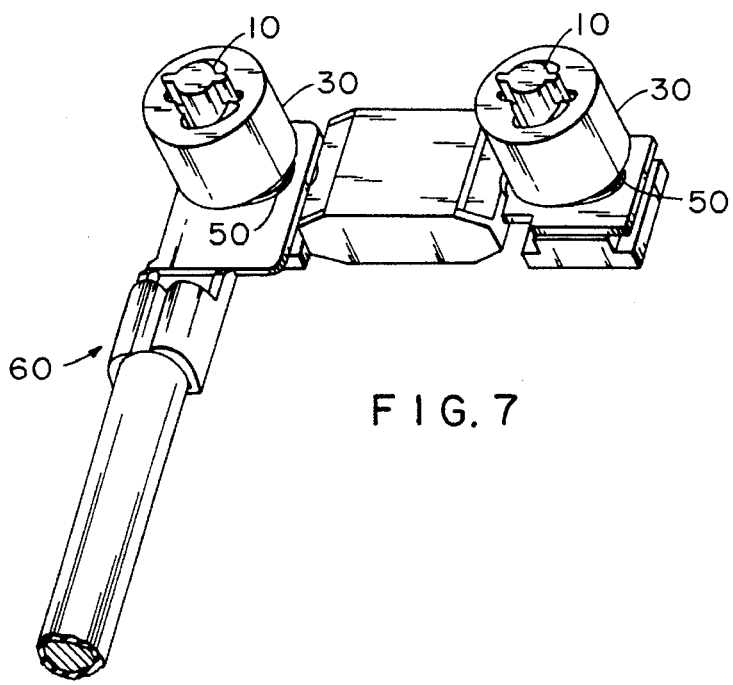
FIG. 7 is a perspective view of the fastener assembly connecting two conducting elements.

The fastener assembly 60 is shown in FIG. 7 connecting a battery terminal cable to a terminal of a power distribution box. It should be noted that fastener assembly 60 can also be used to connect a battery terminal cable to a mega fuse attachment. This type of fastener may also be useful in connections for other high current applications such as connections made to alternator studs. In practice, such studs would have to be modified to function as the bolt of this invention.

Bolt 10 and nut 30 are preferably made of die cast or cast metal, while washer 50 is preferably made of a spring metal material. The size of the fastener assembly will depend on the specific application.

Bolt 10, nut 30 and washer 50 are not threaded devices. Thus, improperly seating nut 30 on bolt 10 and cross-threading is not a problem with the device of this invention, as it is with conventional fasteners. The fastener can be designed such that the bolt's external geometry is pentagonal, triangular, oval, circular or other configuration. Thus, only a matching shaped wrench would be required to tighten the fastener. Further, the nut can also have tool attachment features to assist the operator when connecting or disconnecting the fastener. Also, because thread friction between nut 30 and bolt 10 are not being relied on to assure a sufficient clamping force for the electrical connection, vehicle vibration will not hinder a connection made using fastener 60 as is the case with conventional fasteners. The assembly can also be designed integral with other components, for example, where the bolt is the terminal post of a battery and the nut and washer are installed onto such post.

Having described the presently preferred embodiments, it is to be understood that the invention may be otherwise embodied within the scope of the appended claims.

What is claimed is:

1. A fastener assembly comprising:
   (a) a bolt having a head, a cylindrical stem and a bolt keying means provided thereon, said stem extending outwardly from and perpendicular to the head of said bolt and having a first end abutting said head and an opposite second end said bolt keying means having two pair of diametrically opposed longitudinal ribs, said first pair of ribs extending approximately half of the length of said stem from said opposite second end toward said first end, said second pair of ribs extending approximately half of the length of said stem from said first end toward said second end;
   (b) a nut having internal slots and a first and a second opposed surface, said internal slots running from said first surface to said second surface, said slots corresponding to said first pair of ribs of said bolt such that said bolt and said nut can be suitably engaged, said internal ramps beginning at said second surface and extending approximately one-quarter of the distance around and internally of said nut providing a surface for said first pair of ribs to travel thereon, said ramps having a notch for receiving one of the first pair of ribs of said bolt such that the nut and bolt interlock; and
   (c) a spring means having a spring keying for mating with said bolt, said spring means being disposed on the bolt to provide a linear force between the nut and the head of the bolt responsive to deflection of said spring means when said spring means is located between said nut and said bolt head.

2. A fastener assembly as set forth in claim 1 in which said spring means is a spring washer.

3. A fastener assembly as set forth in claim 2 in which said bolt and nut are threadless and said spring washer is curved.

4. A fastener assembly as set forth in claim 1 in which said bolt and nut are made of die cast metal and said spring means is made of spring metal material.

5. A fastener assembly as set forth in claim 1 in which said linear forces created between said nut and said bolt is adjustable between 10 and 150 pounds.

6. A fastener assembly as set forth in claim 1 in which said linear force created between said nut and said bolt exceeds 150 pounds.

7. A fastener assembly as set forth in claim 1 in which said linear force is proportional to the deflection of said spring means.

8. A fastener assembly as set forth in claim 1 wherein said nut further has a retaining groove in which said washer is located and retained.

9. A fastener assembly as set forth in claim 1 in which said internal ramps are circular.

10. A fastener assembly as set forth in claim 1 in which said spring means is a coil spring.

11. A fastener assembly comprising:
 (a) a threadless bolt, said bolt further comprising:
   (i) a head;
   (ii) a cylindrical stem, said stem extending outwardly from and perpendicular to said head and having a first end abutting said head and an opposite second end; and
   (iii) a bolt keying means disposed on said bolt, said bolt keying means further comprising two pair of diametrically opposed longitudinal ribs, said first pair of ribs extending approximately half of the length of said stem from said opposite second end toward said first end, said second pair of ribs extending approximately half of the length of said stem from said first end toward said second end; and
 (b) a threadless nut, said nut further comprising:
   (i) a first and a second opposed surface;
   (ii) a pair of internal slots running from said first surface to said second surface, said slots corresponding to said first pair of ribs of said bolt such that said bolt and said nut can be suitably engaged; and
   (iii) a pair of internal ramps beginning at said second surface and extending approximately one-quarter of the distance around and internally of said nut providing a surface for said first pair of ribs to travel thereon, each said ramp having a notch for receiving one of the first pair of ribs of said bolt such that the nut and bolt interlock; and
 (c) a curved spring washer having a spring keying means for mating with said bolt, said washer being disposed on the bolt to provide a linear force between said nut and said bolt proportional to deflection of said washer when said washer is located between said nut and said bolt.

12. A fastener assembly as set froth in claim 11 in which said internal ramps are circular.

13. A fastener assembly as set forth in claim 11 in which said bolt and nut are made of die cast or cast metal and said washer is made of spring metal material.

14. A fastener assembly as set forth in claim 11 wherein said nut further has a retaining groove in which said washer is located and retained.

15. A fastener assembly as set forth in claim 11 wherein said linear force created between said nut and said bolt is between 10 and 150 pounds.

16. A fastener assembly as set forth in claim 11 wherein said linear force created between said nut and said bolt exceeds 150 pounds.

* * * * *